US012272866B1

(12) United States Patent
Pelard et al.

(10) Patent No.: US 12,272,866 B1
(45) Date of Patent: Apr. 8, 2025

(54) MILLIMETER-WAVE SURFACE-MOUNT ANTENNA FOR GIGABIT PLASTIC FIBER DATA TRANSPORT

(71) Applicants: Romain Pelard, Redwood City, CA (US); Phillip Kness, San Jose, CA (US); John Sevic, Prescott, AZ (US); Joy Laskar, Cupertino, CA (US)

(72) Inventors: Romain Pelard, Redwood City, CA (US); Phillip Kness, San Jose, CA (US); John Sevic, Prescott, AZ (US); Joy Laskar, Cupertino, CA (US)

(73) Assignee: ATTOTUDE, INC., Menlo Park, CA (US)

( * ) Notice: Subject to any disclaimer, the term of this patent is extended or adjusted under 35 U.S.C. 154(b) by 431 days.

(21) Appl. No.: 17/361,765

(22) Filed: Jun. 29, 2021

Related U.S. Application Data

(63) Continuation of application No. 17/066,218, filed on Oct. 8, 2020, now abandoned.

(51) Int. Cl.
*H01Q 1/36* (2006.01)
*H01Q 1/42* (2006.01)

(52) U.S. Cl.
CPC ............... *H01Q 1/362* (2013.01); *H01Q 1/42* (2013.01)

(58) Field of Classification Search
CPC ................................ H01Q 1/362; H01Q 1/42
See application file for complete search history.

(56) References Cited

U.S. PATENT DOCUMENTS

| | | | | |
|---|---|---|---|---|
| 10,819,035 | B2 * | 10/2020 | Wolniansky | H01Q 13/10 |
| 2011/0248894 | A1 * | 10/2011 | Crowley | H01Q 1/362 343/702 |
| 2016/0064795 | A1 * | 3/2016 | Chang | G02B 6/032 343/893 |
| 2018/0159235 | A1 * | 6/2018 | Wolniansky | H01Q 1/48 |
| 2018/0254127 | A1 * | 9/2018 | Dorner | H01B 11/1847 |

FOREIGN PATENT DOCUMENTS

EP 4125152 A1 * 2/2023

OTHER PUBLICATIONS

Yanghyo Kim, et. al. "High-Speed mm-Wave Data-Link Based on Hollow Plastic Cable and CMOS Transceiver", IEEE Microwave and Wireless Components Letters, vol. 33, No. 12, Dec. 2013 (Year: 2013).*

* cited by examiner

*Primary Examiner* — Seokjin Kim
(74) *Attorney, Agent, or Firm* — Dunlap Codding, P.C.

(57) ABSTRACT

A compact millimeter-wave surface mount helix antenna for high-speed data transport over low-cost plastic fiber is described. Guided millimeter-wave technology enables gigabit transport in the centimeter to meters range, complementing current transport technologies based on optical fibers, coaxial flyover assemblies, and PCB traces. To maintain signal integrity requires an efficient launch of millimeter-waves into the plastic fiber, with low loss and minimum signal impairment. A compact helix antenna provides efficient coupling and wide bandwidth, enabling meter-range copper-grade gigabit transport.

17 Claims, 6 Drawing Sheets

MILLIMETER-WAVE SURFACE-MOUNT ANTENNA FOR GIGABIT PLASTIC FIBER DATA TRANSPORT

BACKGROUND

Recently there has been interest in adoption of millimeter-wave technology for high-speed data transport to compliment current enterprise technologies, such as optical and metal-based interconnects, offering substantial advantages in bandwidth, reach, power consumption, and cost. Optical transport is well-suited for longer reaches, where power consumption due to electro-optic conversion is justified. Similarly, metal-based interconnects, such as coaxial cable or PCB traces, are ideally suited for shorter reaches. Millimeter-wave data transport based on low-cost plastic fibers fills an important gap between optical and metal-based transport, providing bandwidth and reach superior to metal with less power consumption than optical. At the appropriate frequency, low-cost plastic fibers transport electromagnetic energy with substantially lower loss than free-space, particularly at 60 GHZ, and are therefore well-suited for guided-wave gigabit data transport.

A plastic microwave fiber (PMF) guided-wave system is composed of the plastic fiber, a millimeter-wave radio, and some means of efficiently and reliably coupling energy between the radio and the fiber. Many different plastic-like compounds, such as polytetrafluoroethylene (PTFE) and polyethylene, can be used for fiber fabrication, and CMOS-based millimeter-wave single-chip radios have been developed, based on various architectures and design philosophies (References 1-6). To fully exploit the available bandwidth and reach the plastic fiber offers, it is crucial that radio-to-fiber coupling efficiency be as high as possible.

The following References are illustrative of the state of the art:

[1] Nokia Bell Labs Prize Ideas—RF through Fiber (2014 Bell Labs Prize Winner)—online: https://www.bell-labs.com/closeup-rf-fiber/.

[2] P. Reynaert, et al, Polymer Microwave Fibers: A Blend of RF, Copper and Optical Communication, in Proceedings of the ESSCIRC, 2016, pp. 15-20.

[3] http://www.polymermicrowavefiber.com/.

[4] J. Laskar, "Complete CMOS mmW Links for Consumer Volume and Cost Structure," IEEE Radio and Wireless Symposium (RWS), 2017, pp. 49-50.

[5] https://www.st.comlen/wireless-transceivers-meus-and-modules/60-ghzshort-range-rf-transceivers.html.

[6] N. Van Thienen, et al, "A Multi-Gigabit CPFSK Polymer Microwave Fiber Communication Link in 40 nm CMOS," IEEE Journal of Solid State Circuits, 2016, Vol. 51, no. 8, pp. 1952-1958.

[7] S. Fukuda et al, "A 12.5+12.5 Gb/s Full-Duplex Plastic Wave-guide Interconnect," IEEE Journal of Solid-State Circuits, December 2011, vol. 46, no. 12, pp. 3113-3125.

[8] Y. Kim, et al, "High-Speed mm-Wave Data-Link Based on Hollow Plastic Cable and CMOS Transceiver," IEEE Microwave and Wireless Components Letters, December 2013, vol. 23, no. 12, pp. 674-676.

[9] M. Tytgat and P. Reynaert, "A Plastic Wave-guide Receiver in 40 nm CMOS with On-chip Bond-wire Antenna," Proceedings of the ESSCIRC, 2013, pp. 335-338.

[10] D. Gloge, "Weakly Guiding Fibers," Applied Optics, 1971, Vol. 10, no. 10, pp. 2252-2258.

[11] A. Gerrard and J. Burch Introduction to Matrix Methods in Optics, Wiley, London, 1975.

[12] CST Studio Suite Electromagnetic Field Simulation Software, Dassault Systemes, 2019.

BRIEF DESCRIPTION OF THE DRAWING FIGURES

DETAILED DESCRIPTION

Summary

A compact millimeter-wave surface mount helix antenna for high-speed data transport over low-cost plastic fiber is described. Guided millimeter-wave technology enables gigabit transport in the centimeter to meters range, complementing current transport technologies based on optical fibers, coaxial flyover assemblies, and PCB traces. To maintain signal integrity requires an efficient launch of millimeter-waves into the plastic fiber, with low loss and minimum signal impairment. A compact helix antenna provides efficient coupling and wide bandwidth, enabling meter-range copper-grade gigabit transport.

Description

Several approaches have adopted fiber with a rectangular cross-section, since it is polarization holding, and therefore integrates with various types of linearly polarized (LP) antennas (Reference 7). However, the unequal bend-radius is a disadvantage of this approach. Circular cross-section fiber is not LP-holding, so not only is there polarization loss between the radio and fiber, when using an LP antenna, there remains the important issue of fiber alignment to the antenna (Reference 8). Various other approaches have also been suggested for novel coupling (Reference 9).

LP polarization degeneracy of circular cross-section fiber may be neutralized by efficiently launching a circularly polarized (CP) wave into the fiber. The helix antenna is one such radiating structure that radiates CP, and in fact can be connector-less, in contrast to existing PMF coupling methods based on complicated transition structures.

Described herein is a millimeter-wave helix surface-mount antenna for high-speed data transport over low-cost plastic fiber. Guided millimeter-wave technology enables gigabit transport in the centimeter to meters range, to complement existing transport technologies based on optical fibers, flyover assemblies, and PCB traces. The electromagnetic behavior of a millimeter-wave helix surface-mount antenna optimized for launch efficiency into a circular-core plastic fiber for gigabit interconnect is described.

Millimeter-Wave Gigabit Transport

Figure 1:
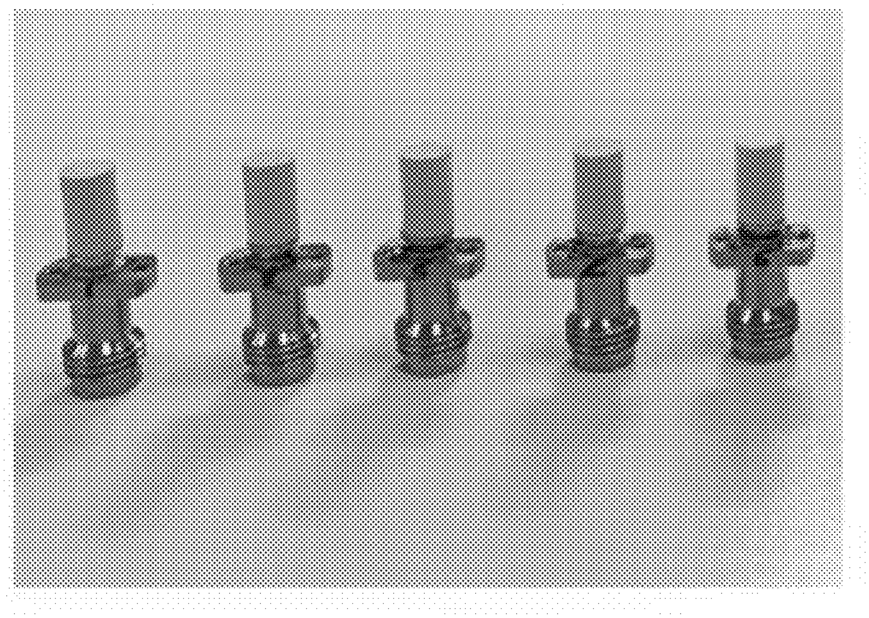
FIG. 1 shows a photograph of the Maja SPL-100 millimeter-wave helix surface-mount antenna; each antenna is attached to a high-performance 1.85 mm coaxial press-fit transition.

FIG. 1 shows a photograph of the Maja SPL-100 millimeter-wave helix surface-mount antenna; each antenna is attached to a high-performance 1.85 mm coaxial press-fit transition. The cylindrical form-factor and physical dimensions of the millimeter-wave helix antenna form a natural pairing with the circular cross-section of the plastic fiber, forming an efficient and reliable interface for coupling and guiding CP electromagnetic radiation. These advantageous properties of the helix antenna are exploited in a PMF application using a section of plastic fiber and a millimeter-wave radio, as shown in FIG. 2.

Figure 2:
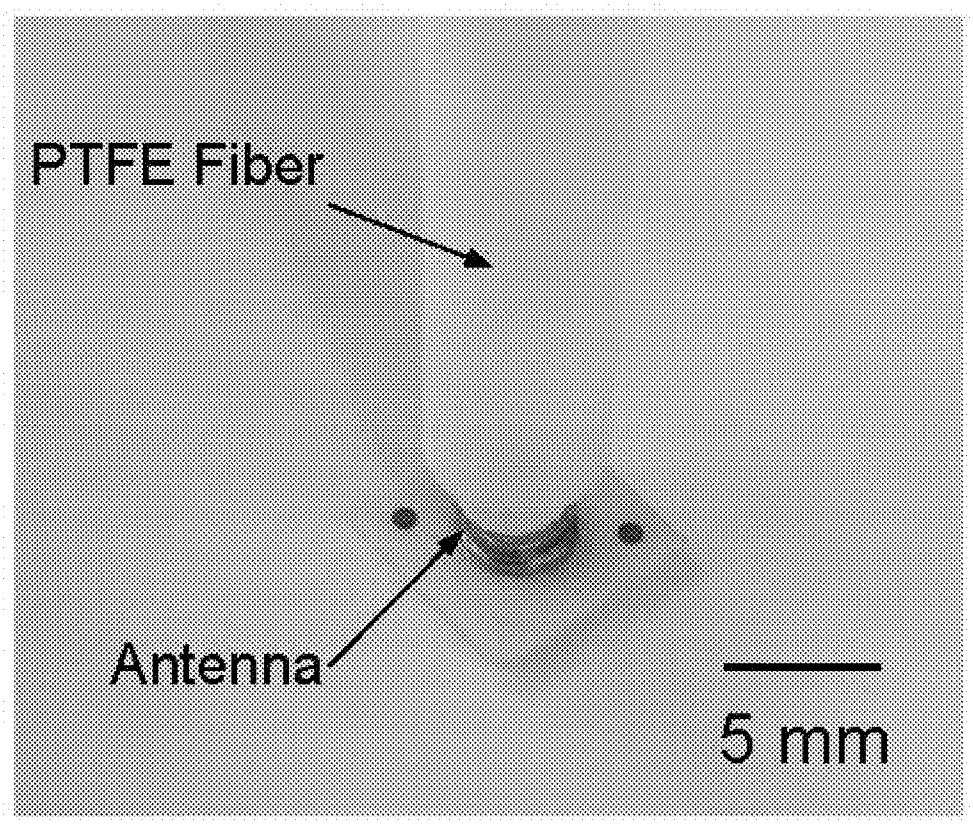
FIG. 2 is a diagram of a section of PTFE fiber coupled to a helix antenna element.

FIG. 2 illustrates a section of PTFE fiber coupled to a helix antenna element.

In the application of FIG. 2, many distinct performance advantages are evident. In contrast to metal-based interconnects, such as coaxial cable or PCB traces, PMF exhibits an inherent immunity to electromagnetic interference. Circular-core plastic fiber fits over the entire helix antenna housing, eliminating the need for any sort of dedicated connector and reducing sensitivity to connector misalignment. Because of the natural pairing of the fiber with the antenna, the interface is much more reliable and robust than a copper-based interface, that relies on precision metal-working to maintain signal integrity. Similarly, for constant signal-quality, such as BER, the loss per meter of PTFE is an order of magnitude lower than copper-based PCB traces, enabling longer reach.

The power necessary for electro-optic conversion generally can only be justified for +100 Gbps applications or when a +1 km reach is necessary, for example in data transport back-haul. By eliminating the need for electro-optic conversion, PMF-based data transport provides many advantages over optical and metal-based interconnects, particularly for applications involving +10 Gbps over several meters.

Table 1 provides a comparison of each technology.

TABLE 1

Comparison of Gigabit Data Transport Technologies.

| | PCB and Coax | Optical Fiber | mmW Fiber |
|---|---|---|---|
| Connector Interface | Complicated | Complicated | Simple |
| Bandwidth (Gbps) | >10 | >100 | >10 |
| Loss | High | Low | Low |
| Reach | centimeter | kilometer | meter |
| Power Consumption | None | | Low |
| EMI Immunity | Good | | Good |

Plastic Microwave Fiber Launch

Plastic fiber comes in various cross-sections and dielectric compositions. A fiber of homogeneous circular cross-section is substantially more flexible than rectangular cross-section fiber, and in contrast to hollow-core plastic fiber, is crush resistant. Indeed, these limitations of rectangular cross-section plastic fiber are frequently justified by adoption of simplified linearly-polarized coupling methods that sacrifice efficiency for overall performance.

The simplicity of the helix antenna and its efficient generation of CP waves avoids the LP mode degeneracy of circular-core fiber. This enables for example, polarization diversity for fiber-bundling many adjacent close-packed fibers to create 28 Gbps and 56 Gbps links in the meter range.

Figure 3:
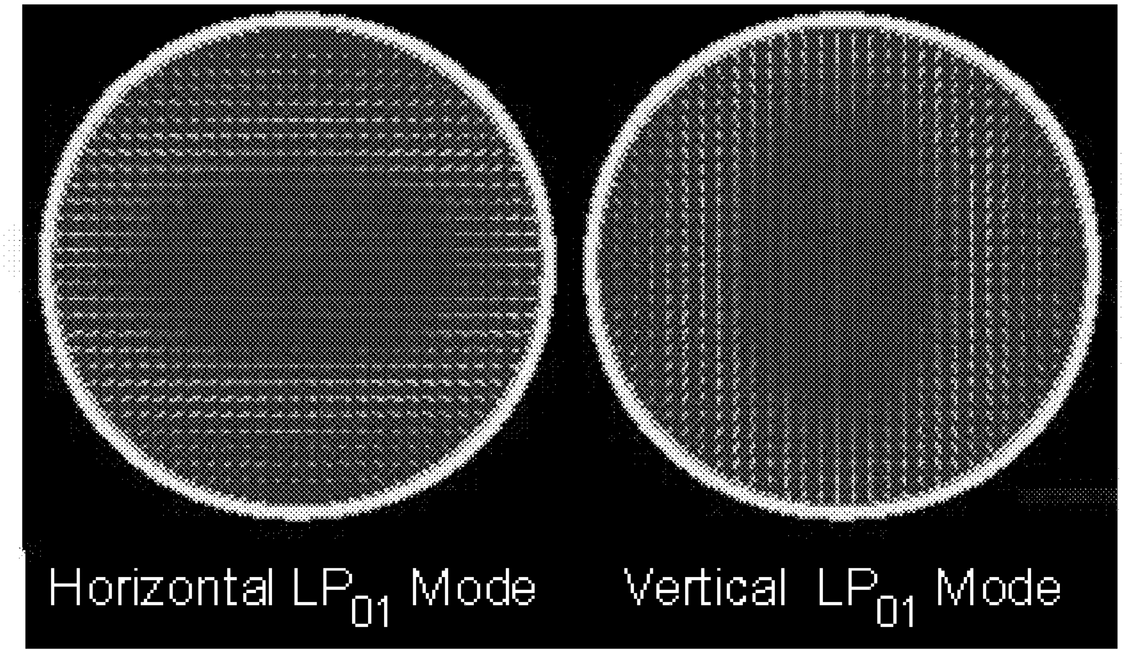
FIG. 3 is a diagram showing horizontal and vertical LP01 electric field eigenmodes of circular cross-section plastic fiber in air.

In rectangular coordinates, the horizontal and vertical LP01 eigenmodes of circular-core plastic fiber are approximated as $$E_H \approx E_o \Psi(x,y) a_x \tag{1a}$$

$$E_V \approx E_o \Psi(x,y) a_y \tag{1b}$$

where $E_o$ is the peak electric field and $\Psi(x, y)$ is a mode profile function; the propagation dependence and time dependence have been suppressed for simplicity. Because the circular-core fiber is homogeneous over its cross-section, the mode profile function $\Psi(x, y)$ applies to each of the two $LP_{01}$ eigenmodes. These degenerate modes are shown in FIG. 3. Using phasor notation, right- and left-hand CP waves are expressed as linear combinations of these two LP01 eigenmodes as $$E_{RHCP} = \frac{E_o \Psi(x, y)(1 + j)}{\sqrt{2}} \tag{2a}$$

$$E_{LHCP} = \frac{E_o \Psi(x, y)(1 - j)}{\sqrt{2}} \tag{2b}$$

and since the plastic fiber cross-section is axially symmetric and uniform along the propagation axis, each $LP_{01}$ mode travels with identical group velocity. Uniform circular-core fiber is therefore CP mode-preserving, enabling full-duplex transmission on the same frequency due to polarization diversity. The helix antenna naturally produces CP waves and hence provides an efficient and reliable means of coupling energy between the radio and circular-core fiber. By properly forming the end section of the fiber, a connector-free transition can be established, as illustrated in FIG. 2.

Figure 4:
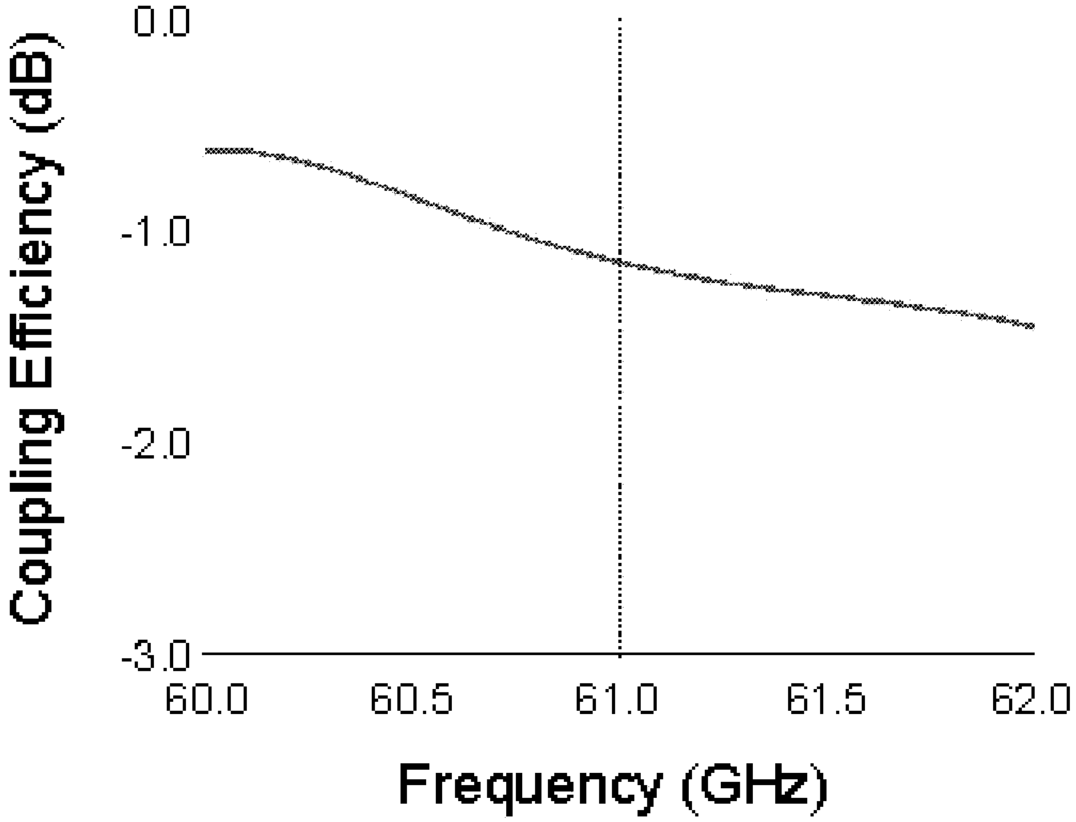
FIG. 4 is a diagram showing simulated coupling of a helix antenna transition to a PTFE circular-core fiber.

FIG. 4 shows simulated coupling of the helix antenna into a section of PTFE circular-core fiber. The antenna center frequency and operating bandwidth, corresponding to approximately 61.0 GHz and approximately 2.0 GHZ, respectively, are chosen for support of channel 2 and channel 3 of the 60 GHz ISM band and modulation bandwidth. Over this bandwidth the helix antenna produces better than-2.0 dB of coupling to the fiber, demonstrating the efficiency of the helix antenna as a transition to low-cost plastic fibers. This coupling efficiency is believed to be the highest reported to-date.

Polarization quality of a CP antenna is distinguished by the axial ratio, AR, defined as $$AR = \frac{|E_V|}{|E_H|} \tag{3}$$

where $E_H$ and $E_V$ are defined by Equations 1a and 1b, respectively. Note that an ideal CP antenna will exhibit an AR=1. The axial ratio of a CP antenna can be extracted from an anechoic measurement or from well-calibrated computational electromagnetic tools, such as CST.

Figure 5:
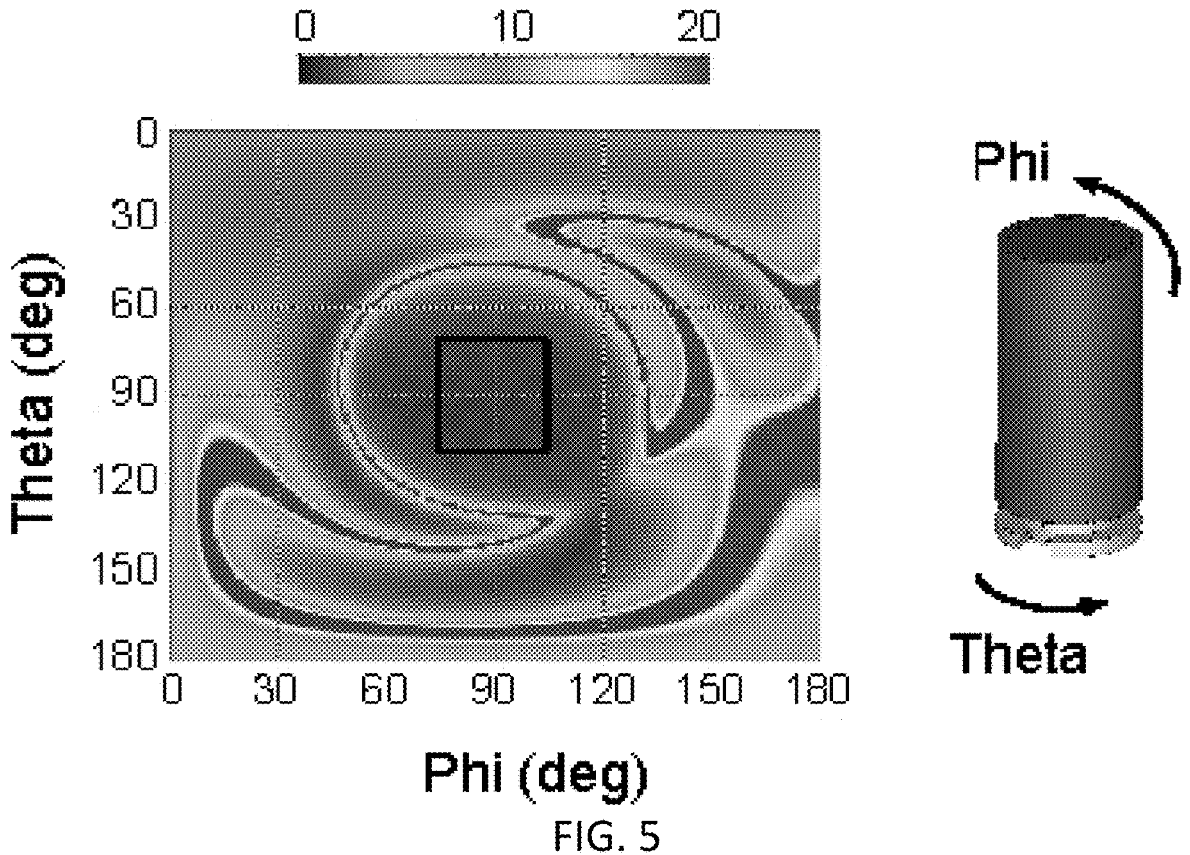
FIG. 5 is a diagram showing the simulated AR of the helix antenna, at 60 GHz.

Shown in FIG. 5 is the simulated AR of our helix antenna, at 60 GHz. Along the bore-site axis it may be seen that AR is better than 1.5.

System-Level Performance

Figure 6:
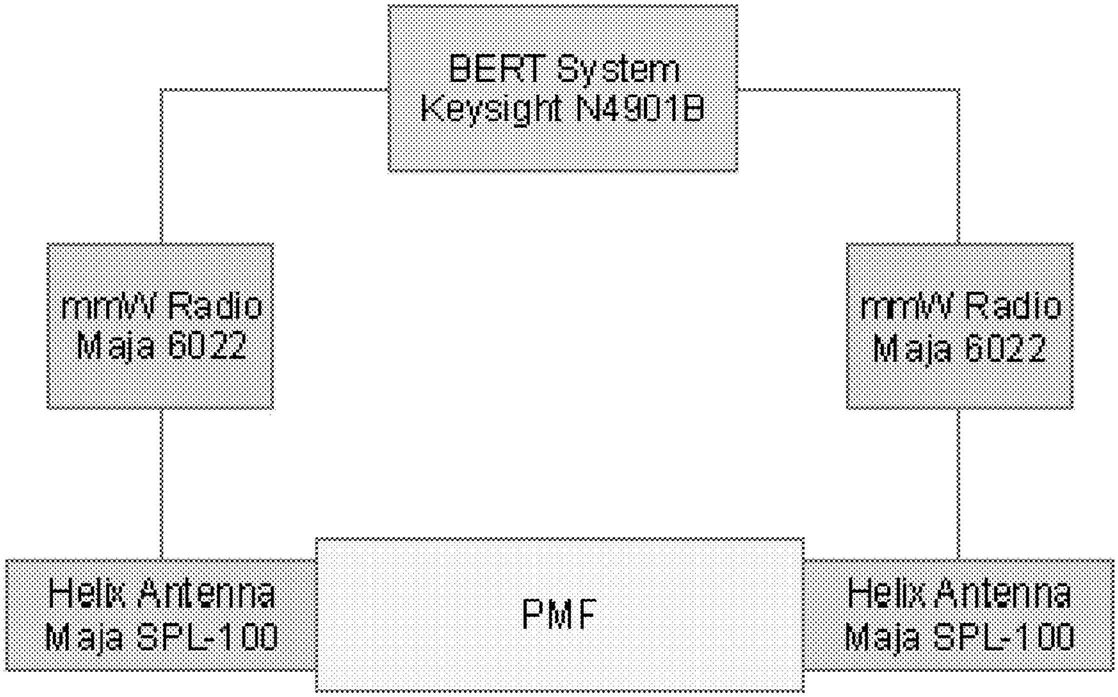
FIG. 6 is a diagram of a bit error rate test bed.
Figure 7A:
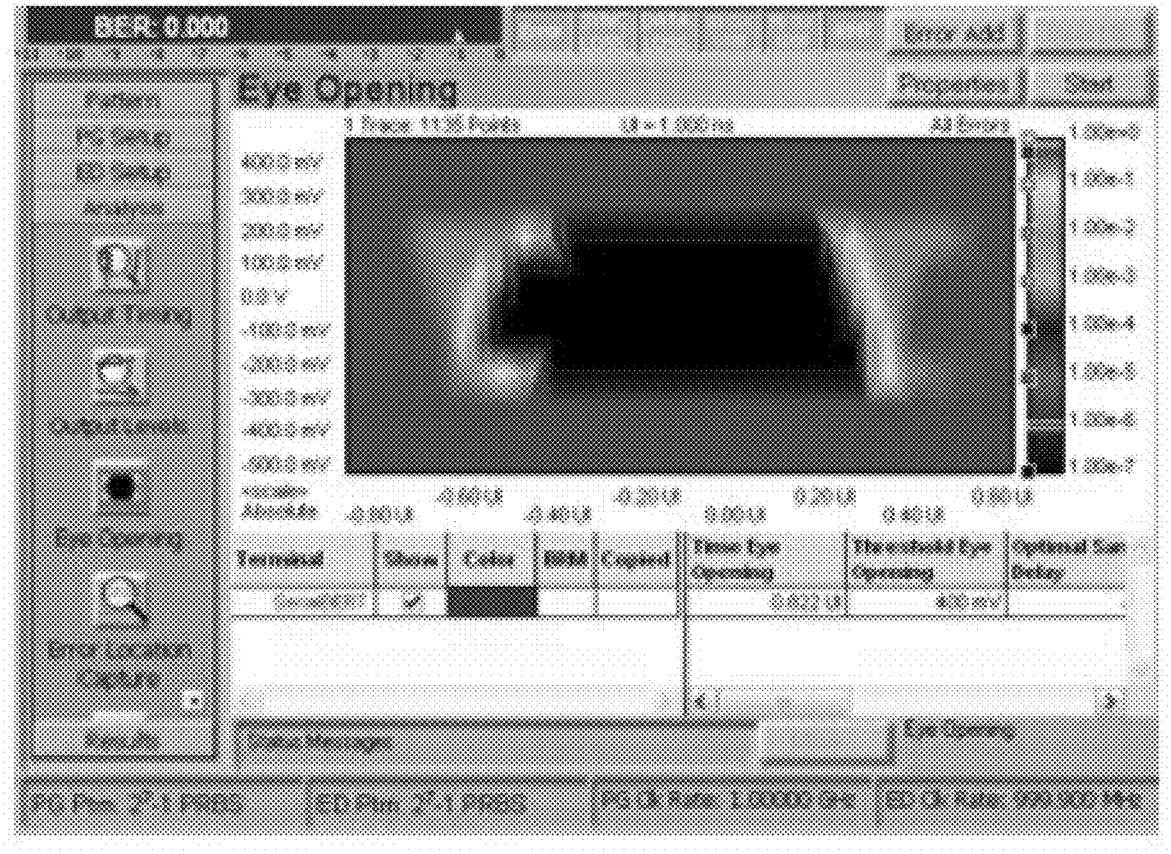
FIG. 7A is an eye diagram for a 1 Gbps PMF Link using the helix antenna.
Figure 7B:
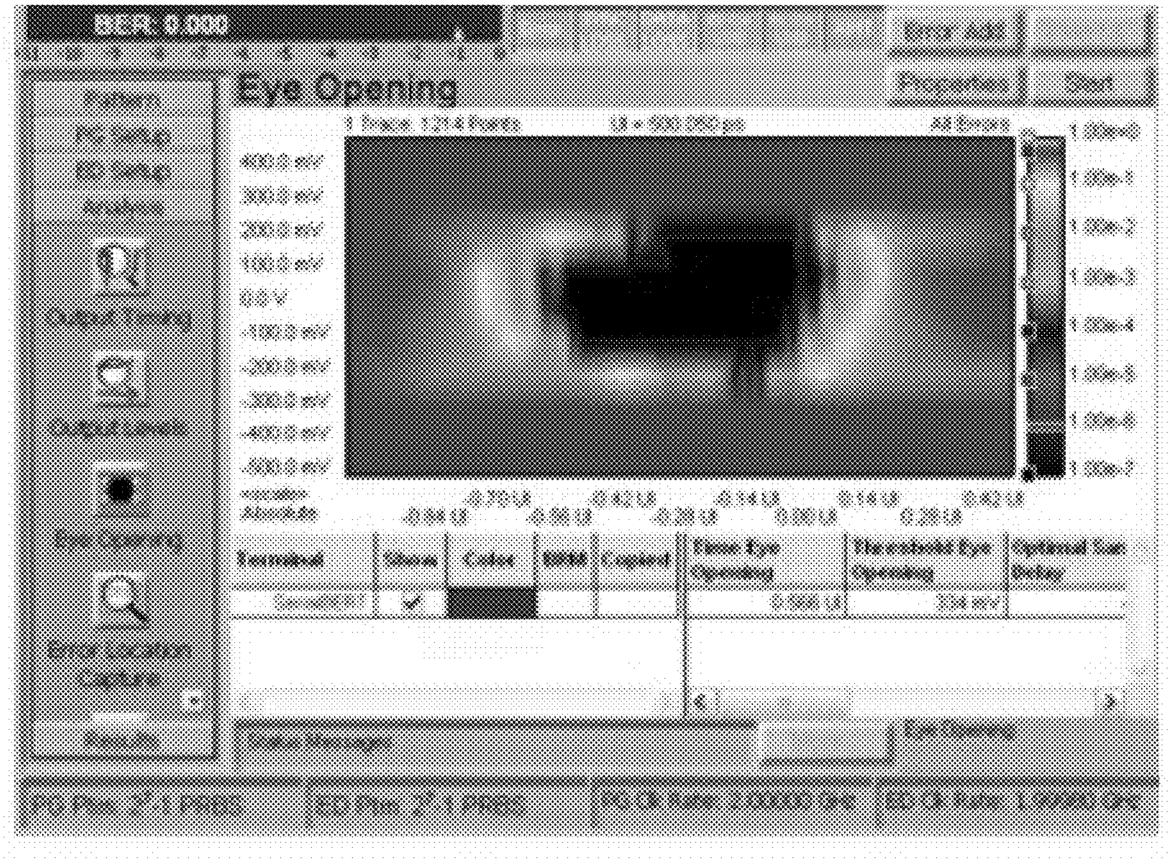
FIG. 7B is an eye diagram for a 2 Gbps PMF Link using the helix antenna.

The performance of the helix antenna interconnect was evaluated in a Bit Error Rate Test (BERT) test-bed using an Agilent N4901B BERT system for signal quality characterization and a pair of Maja 6022 millimeter-wave fully integrated digital 60 GHz CMOS transceivers. Each transceiver comes with an integrated high-speed serial port directly interfacing with the Agilent N4901B, as shown in FIG. 6. FIG. 7*a* illustrates an eye diagram for a I Gbps PMF link using the SPL-100 helix antenna to couple electromagnetic energy to a 5.0 m length of circular-core PTFE with diameter 6.2 mm. The clean eye diagram corresponds to a BER of $\sim 10^{-13}$, approaching copper-based PCB traces and coaxial cable passive elements. Similarly, FIG. 7*b* illustrates an eye diagram for a 2 Gbps PMF link. The clean eye diagram corresponds to a BER of $\sim 10^{-13}$, approaching copper-based PCB traces and coaxial cable passive elements. The eye diagram suggests the operating bandwidth of the helix antenna is substantially wider than the modulation bandwidth of the 2 Gbps NRZ BPSK modulation scheme used in FIG. 7.

Summary

Figure 8:
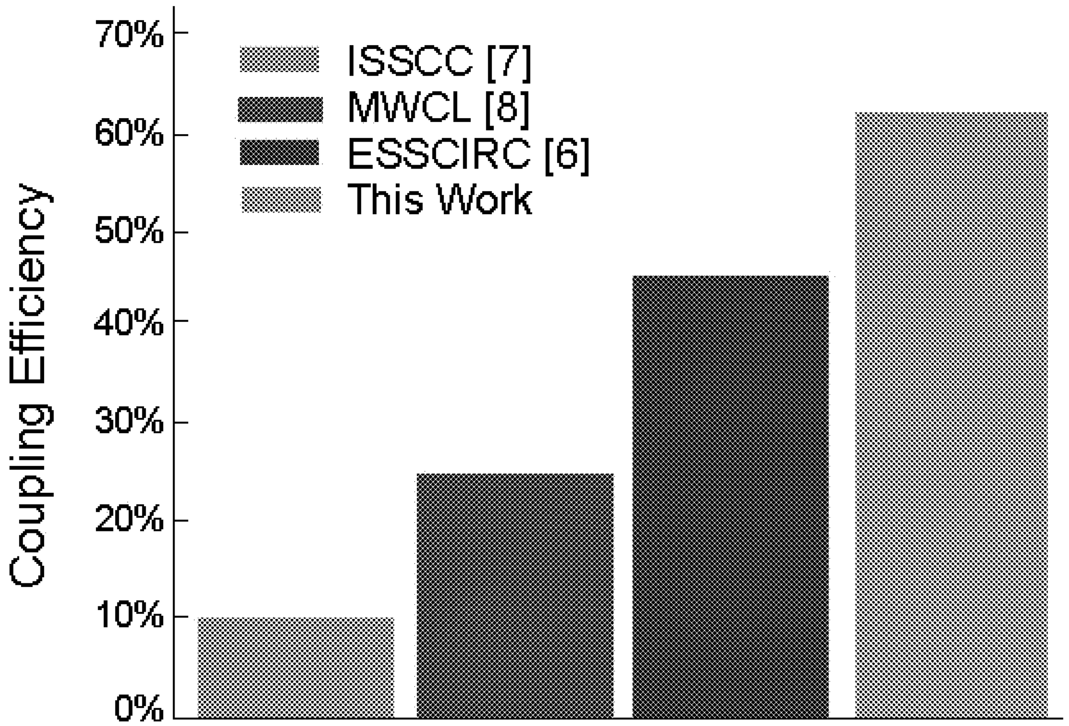
FIG. 8 is a diagram comparing the described data transport arrangement with other data transport arrangements.

A PMF system based on compact millimeter-wave surface mount helix antenna has been described, with a high coupling efficiency better than 60% (believed to be the highest reported to-date for 60 GHz applications). A comparison to existing technologies is shown in FIG. 8. While other various fiber cross-sections are available for PMF systems, circular-core fiber is substantially more flexible than rectangular cross-section fiber, and in contrast to hollowcore plastic fiber, is crush resistant. The simplicity of the helix antenna is described and its efficient generation of CP waves avoids the LP mode degeneracy of circular-core fiber. This enables, for example, polarization diversity for fiber-bundling many adjacent close-packed fibers to create 28 Gbps and 56 Gbps links in the meter range. It is expected this interconnect technology will find applications guided millimeter-wave PMF links, enabling gigabit transport in the centimeter to meters range, complementing current transport technologies based on optical fibers, coaxial flyover assemblies, and PCB traces.

Non-Limiting Illustrative Embodiments of the Inventive Concepts

The following is a numbered list of non-limiting illustrative embodiments of the inventive concepts disclosed herein:

- Illustrative embodiment 1. A plastic millimeter-wave fiber data communications system comprising: a plastic millimeter-wave fiber; a first antenna coupled to a first radio and to the plastic millimeter-wave fiber; and a second antenna coupled to a second radio and to the plastic millimeter-wave fiber; wherein the first antenna is a circularly polarized antenna.
- Illustrative embodiment 2. The data communications system of illustrative embodiment 1, wherein the first antenna is a circularly polarized helical antenna.
- Illustrative embodiment 3. The data communications system of illustrative embodiment 2, wherein the second antenna is a circularly polarized helical antenna.
- Illustrative embodiment 4. The data communications system of illustrative embodiment 3, wherein the first and second antennas are surface-mount antennas.
- Illustrative embodiment 5. The data communications system of illustrative embodiment 1, wherein: the first antenna comprises a radome; and the first antenna is coupled to the PMF by causing the radome to abut or nearly abut a flat surface of the plastic fiber.
- Illustrative embodiment 6. The data communications system of illustrative embodiment 5, wherein: the second antenna comprises a radome; and the second antenna is coupled to the PMF by causing the radome to abut or nearly abut a flat surface of the plastic fiber.
- Illustrative embodiment 7. A method of data communications using a plastic millimeter-wave fiber, a first helical antenna comprising a first radome and coupled to first radio and a second helical antenna comprising a second radome and coupled to a second radio, comprising: coupling the first antenna to an end of the plastic millimeter-wave fiber by causing the first radome to abut or nearly abut an end of the plastic millimeter-wave fiber; coupling the second antenna to an end of the plastic millimeter-wave fiber by causing the second radome to abut or nearly abut an end of the plastic millimeter-wave fiber; transmitting at least one circularly polarized electromagnetic wave from the first antenna; and receiving the at least one circularly polarized electromagnetic wave at the second antenna.
- Illustrative embodiment 8. The data communications system of illustrative embodiment 5, wherein the flat surface is situated within a concavity formed in the plastic millimeter-wave fiber.
- Illustrative embodiment 9. The data communications system of illustrative embodiment 1, wherein at least a portion of the plastic millimeter-wave fiber is metal-clad.

What is claimed is:

1. A plastic millimeter-wave fiber data communications system, comprising:

a plastic millimeter-wave fiber;

a first antenna coupled to a first radio and the plastic millimeter-wave fiber; and a second antenna coupled to a second radio and the plastic millimeter-wave fiber; and wherein the first antenna is a circularly polarized antenna comprising a radome, and the first antenna is coupled to the plastic millimeter-wave fiber by causing the radome to abut or nearly abut a flat surface of the plastic millimeter-wave fiber, and the flat surface is situated within a concavity formed in the plastic millimeter-wave fiber.

2. The plastic millimeter-wave fiber data communications system of claim 1, wherein the first antenna is a circularly polarized helical antenna.

3. The plastic millimeter-wave fiber data communications system of claim 2, wherein the first antenna is a first circularly polarized helical antenna, and the second antenna is a second circularly polarized helical antenna.

4. The plastic millimeter-wave fiber data communications system of claim 3, wherein the first antenna and the second antenna are surface-mount antennas.

5. The plastic millimeter-wave fiber data communications system of claim 1, wherein the radome is a first radome, the flat surface is a first flat surface, the second antenna comprises a second radome, and the second antenna is coupled to the plastic millimeter-wave fiber by causing the second radome to abut or nearly abut a second flat surface of the plastic millimeter-wave fiber.

6. A method of data communications using a plastic millimeter-wave fiber, a first helical antenna comprising a first radome and coupled to a first radio, and a second helical antenna comprising a second radome and coupled to a second radio, comprising:

coupling the first helical antenna to a first flat surface of the plastic millimeter-wave fiber by causing the first radome to abut or nearly abut the first flat surface of the plastic millimeter-wave fiber;

coupling the second helical antenna to a second flat surface of the plastic millimeter-wave fiber by causing the second radome to abut or nearly abut the second flat surface of the plastic millimeter-wave fiber;

transmitting at least one circularly polarized electromagnetic wave from the first helical antenna; and receiving the at least one circularly polarized electromagnetic wave at the second helical antenna; and wherein one of the first flat surface of the plastic millimeter-wave fiber and the second flat surface of the plastic millimeter-wave fiber is situated within a concavity formed in the plastic millimeter-wave fiber.

7. The plastic millimeter-wave fiber data communications system of claim 1, wherein at least a portion of the plastic millimeter-wave fiber is metal-clad.

8. A plastic millimeter-wave fiber data communications system, comprising:

a plastic millimeter-wave fiber having a concavity;

a radio; and an antenna coupled to the radio and to the plastic millimeter-wave fiber; and wherein the antenna includes a radome, and wherein the antenna is coupled to the plastic millimeter-wave fiber by causing the radome to abut or nearly abut a flat surface of the plastic millimeter-wave fiber, and the flat surface is situated within the concavity in the plastic millimeter-wave fiber.

9. The plastic millimeter-wave fiber data communications system of claim 8, wherein the antenna is a helical antenna.

10. The plastic millimeter-wave fiber data communications system of claim 9, wherein the antenna is a helical surface-mount antenna.

11. The plastic millimeter-wave fiber data communications system of claim 9, wherein the antenna is a circularly polarized helical antenna.

12. The plastic millimeter-wave fiber data communications system of claim 8, wherein at least a portion of the plastic millimeter-wave fiber is metal-clad.

13. The plastic millimeter-wave fiber data communications system of claim 8, wherein at least a portion of the plastic millimeter-wave fiber is constructed of polytetrafluoroethylene (PTFE).

14. The plastic millimeter-wave fiber data communications system of claim 8, wherein at least a portion of the plastic millimeter-wave fiber is constructed of polyethylene.

15. The plastic millimeter-wave fiber data communications system of claim 8, wherein the plastic millimeter-wave fiber has a circular cross-section.

16. The plastic millimeter-wave fiber data communications system of claim 8, wherein the plastic millimeter-wave fiber has a circular core.

17. The plastic millimeter-wave fiber data communications system of claim 8, wherein the radio is a millimeter-wave radio.

* * * * *